Patented Feb. 14, 1950

2,497,503

UNITED STATES PATENT OFFICE 2,497,503

PREPARATION OF SUBSTITUTED PHENOLS

John Leslie Jones, Toledo, Ohio, assignor to Libbey-Owens-Ford Glass Company, Toledo, Ohio, a corporation of Ohio No Drawing. Application March 7, 1946, Serial No. 652,790

5 Claims. (Cl. 260—621)

The invention relates to the preparation of substituted phenols, and particularly to an improved method of preparing phenols having unsaturated substituents, and novel products that may be prepared thereby.

Phenols having unsaturated substituents react with formaldehyde to form synthetic resins having unique and valuable properties. However, the production of such phenols heretofore has been relatively expensive and usually has been accompanied by conversion of the phenols into polymers that form inferior resins by reaction with formaldehyde. The lack of a satisfactory method of preparing phenols having unsaturated substituents has retarded the commercialization of the valuable synthetic resins produced by reaction of such phenols with formaldehyde.

The principal object of the invention is the preparation of phenols having unsaturated substituents by a simple, inexpensive method which gives high yields without substantial polymerization of the products and which greatly reduces discoloration so as to give products that produce resins of better color by reaction with formaldehyde. More specific objects and advantages are apparent from the description, which merely discloses and illustrates the invention and is not intended to impose limitations upon the claims.

Substituted phenols are prepared in accordance with the invention by condensing two molecules of phenol in the presence of an acid catalyst with one molecule of a ketone selected from the class consisting of cyclohexanone and alkyl methyl ketones in which the alkyl radicals consist of primary and secondary normal alkyl radicals having from one to five carbon atoms, adding a strong alkali metal base in an amount in excess of the equivalent of the acid catalyst remaining in the condensation product, and heating to pyrolize the condensation product and to distill off the substituted phenol.

When two molecules of phenol are condensed with one molecule of a ketone in the presence of an acid catalyst, it is difficult to remove the acid catalyst from the resulting condensation product. The acid catalyst employed in such a condensation is a strong mineral acid such as hydrochloric or sulfuric acid, and it is difficult to remove the acid from the condensation product even by repeated washing with water.

Heretofore, the pyrolysis of such a condensation product made by a commercially feasible process has resulted in a low yield of the substituted phenol, because much of the substituted phenol has been lost by polymerization.

The present invention is based upon the discovery that when the acid catalyst remaining in such a condensation product is neutralized by addition of a strong alkali metal base, subsequent pyrolysis of the condensation product so treated causes the substituted phenol produced by the pyrolysis to distill off substantially free from polymerization products, so that a greatly improved yield of the substituted phenol is obtained. If, instead, the acid catalyst remaining in the condensation product is neutralized by addition of any other common base, or is removed as completely as it can be removed by washing a reasonable number of times with water, pyrolysis of the condensation product thus treated is accompanied by considerable polymerization of the substituted phenol which distills off during the pyrolysis.

In the condensation of two molecules of phenol with one molecule of a ketone that takes place in the first step of the present method, the two hydrogen atoms at the p-positions in the two molecules of phenol combine with the oxygen atom from the ketone to form a molecule of water, so that the oxygen atom in the ketone is replaced by two 4-hydroxy phenyl radicals. Thus the condensation product has the same molecular structure as the ketone except that it has two 4-hydroxy phenyl radicals in place of the oxygen atom of the ketone.

The ketones that may be employed for condensation with phenol in the first step of the present method are cyclohexanone and alkyl methyl ketones in which the alkyl radical is methyl, ethyl, propyl, isopropyl, butyl, isobutyl, secondary butyl, amyl or any other primary or secondary normal alkyl radical containing five carbon atoms. The simplest ketones, acetone and methyl ethyl ketone are preferred.

Although only two molecules of phenol actually condense with each molecule of the ketone, an excess of phenol may be used to promote the reaction so as to minimize loss of the ketone. The condensation may be conducted at room temperature but is more rapid between 30 and 90° C.

The strong alkali metal bases that may be employed to neutralize the acid catalyst remaining in the condensation product include the hydroxides, carbonates and bicarbonates of sodium and potassium. The alkali metal base may be added in solid form or in the form of a solution in water or in another solvent such as an alcohol.

An aqueous phase usually is present upon addition of the alkali metal base, and it is difficult to carry out intimate mixing of the base with the acid catalyst in the condensation product. An amount of the alkali metal base in excess of the equivalent of the acid catalyst remaining in the condensation product may be used to insure eventual complete neutralization of the acid catalyst. Any water phase that is present after the addition of the alkali metal base may be discarded, and the condensation product may then be washed if desired to remove most of the salt formed by the neutralization. The amount of alkali metal base remaining in the condensation product when pyrolysis is begun should be at least the equivalent of the amount of free acid then remaining in the condensation product, so that eventual complete neutralization of the acid catalyst takes place as the heating proceeds. At the time of pyrolysis, since the acid catalyst has been completely neutralized, the pH will be that due to the acidity of the phenolic hydroxy groups, or a slightly greater pH due to the presence of an excess of the alkali metal base. The pyrolysis is carried out by simply heating the condensation product under atmospheric pressure or a vacuum until distillation begins. As the distillation continues, the temperature of the liquid tends to rise. The water present distills off, causing steam distillation of the unreacted phenol that ordinarily is present in the condensation product. At atmospheric pressure, actual pyrolysis of the condensation product usually begins at about 280° C., and the temperature may be kept between 280 and 290° C. until the pyrolysis is completed. If the application of heat is not closely regulated, the temperature of the liquid may rise to 320–330° C. during the pyrolysis.

The products of the pyrolysis are phenol and a phenol having an unsaturated side chain. These products are formed when a molecule of phenol splits off from each molecule of the condensation product, and in the present method they distill off substantially free from dimers and polymers of the substituted phenol. A polymeric residue remains after the distillation is completed, but the amount of such residue is less than in previous commercial methods.

The phenol in the distillate may be separated from the substituted phenol by distillation through a fractionation column. After the phenol has been distilled off, the substituted phenol remaining is pure enough for the preparation of synthetic resins by reaction with formaldehyde, but the substituted phenol may be purified further by vacuum distillation if desired.

It has been found that the present method can be used to prepare a novel substituted phenol that is a 2-(p-hydroxy phenyl) 2-butene, and is a liquid having a boiling point of 85–89° C. at one millimeter of mercury. This substance ordinarily is obtained in admixture with a geometric isomer having a melting point of 86.5° C.

*Example*

A mixture of 3,380 grams of phenol (U. S. P.), 864 grams of methyl ethyl ketone, and 300 grams of a 37 per cent aqueous hydrochloric acid solution is held at 85° C. for 17 hours with mechanical stirring. A solution of 138 grams of sodium hydroxide in 322 grams of water is then added, and stirring is continued for one-half hour. After the separation of 415 grams of a water phase containing sodium chloride, followed by the addition of 250 grams of water, stirring is resumed for an additional one-half hour. The water phase is again separated and is found to have a pH of 8.5. The condensation product (4,525 grams), is heated at atmospheric pressure in a stainless steel kettle for five hours with stirring. During that period the liquid temperature rises gradually to 320° C., and the vapor outlet temperature rises to about 280° C. From the condensed vapors a water phase consisting of 473 grams of water saturated with phenol is separated. A black polymerized residue (150 grams) is left in the kettle. The remainder of the condensate (3,875 grams) is fractionally distilled in vacuum to remove 105 grams of a water-phenol mixture and 2,510 grams of phenol having a boiling point of 94–99° C. at 38–41 millimeters of mercury. The residue (1,190 grams) left from the fractional distillation solidifies on cooling to a pale yellow mixture of 2-(p-hydroxy phenyl) 2-butenes, one of which is a crystalline solid melting at 86.5° C., and the other of which is present in smaller proportion and is a liquid having a boiling point of 85–89° C. at one millimeter of mercury. In the foregoing procedure, the methyl ethyl ketone may be replaced by an equivalent amount of acetone, to produce p-isopropenyl phenol. When methyl n-primary-amyl ketone and cyclohexanone are used in similar procedures, the products are heptenyl and cyclohexenyl phenols, respectively.

Various embodiments of the invention may be devised to meet various requirements.

Having described the invention, I claim:

1. In a method of preparing phenols having unsaturated substituents that comprises (1) condensing two molecules of phenol in the presence of an acid catalyst with one molecule of a ketone of the class consisting of cyclohexanone and alkyl methyl ketones in which the alkyl radicals consist of primary and secondary normal alkyl radicals having from one to five carbon atoms, (2) heating the condensation product to a temperature at which pyrolysis occurs to produce a phenol having an unsaturated substituent and (3) distilling off the substituted phenol, the step of, prior to pyrolyzing, adding to the condensation product a strong alkali metal base in an amount in excess of the equivalent of the acid catalyst remaining in the condensation product, whereby the substituted phenol is distilled without substantial polymerization.

2. In a method of preparing phenols having unsaturated substituents that comprises (1) condensing two molecules of phenol in the presence of an acid catalyst with one molecule of a ketone of the class consisting of cyclohexanone and alkyl methyl ketones in which the alkyl radicals consist of primary and secondary normal alkyl radicals having from one to five carbon atoms, (2) heating the condensation product to a temperature at which pyrolysis occurs to produce a phenol having an unsaturated substituent and (3) distilling off the substituted phenol, the steps of, prior to pyrolyzing, adding to the condensation product a strong alkali metal base in an amount sufficient to insure the eventual neutralization of the acid catalyst remaining in the condensation product, whereby the substituted phenol is distilled without substantial polymerization.

3. In a method of preparing phenols having unsaturated substituents that comprises (1) condensing two molecules of phenol in the presence of an acid catalyst with one molecule of a ketone of the class consisting of cyclohexanone and alkyl methyl ketones in which the alkyl radicals consist of primary and secondary normal alkyl radicals having from one to five carbon atoms, (2) heating the condensation product to a temperature at which pyrolysis occurs to produce a phenol having an unsaturated substituent and (3) distilling off the substituted phenol, the steps of, prior to pyrolyzing, (a) adding to the condensation product a strong alkali metal base in an amount in excess of the equivalent of the acid catalyst remaining in the condensation product and (b) removing alkali metal salt in the form of an aqueous solution, whereby the substituted phenol is distilled without substantial polymerization.

4. In a method of preparing phenols having unsaturated substituents that comprises (1) condensing two molecules of phenol in the presence of an acid catalyst with one molecule of a ketone of the class consisting of cyclohexanone and alkyl methyl ketones in which the alkyl radicals consist of primary and secondary normal alkyl radicals having from one to five carbon atoms, (2) heating the condensation product to a temperature at which pyrolysis occurs to produce a phenol having an unsaturated substituent, (3) distilling off phenol and the substituted phenol and (4) separating the substituted phenol from the phenol by fractional distillation, the step of, prior to pyrolyzing, adding to the condensation product a strong alkali metal base in an amount in excess of the equivalent of the acid catalyst remaining in the condensation product, whereby the substituted phenol is distilled without substantial polymerization.

5. In a method of preparing phenols having unsaturated substituents that comprises (1) condensing two molecules of phenol in the presence of hydrochloric acid with one molecule of an unsubstituted saturated ketone having not more than four carbon atoms, (2) heating the condensation product at a temperature at which pyrolysis occurs to produce a phenol having an unsaturated substituent and (3) distilling off the substituted phenol, the step of, prior to pyrolyzing, adding to the condensation product a strong alkali metal base in an amount in excess of the equivalent of the acid catalyst remaining in the condensation product, whereby the substituted phenol is distilled without substantial polymerization.

JOHN LESLIE JONES.

REFERENCES CITED

The following references are of record in the file of this patent:

UNITED STATES PATENTS

| Number | Name | Date |
| --- | --- | --- |
| 1,798,813 | Schoeller | Mar. 31, 1931 |
| 1,929,209 | Moss | Oct. 3, 1933 |
| 1,986,423 | Arvin | Jan. 1, 1935 |
| 2,182,308 | Britton | Dec. 5, 1939 |

OTHER REFERENCES

Beilstein, 4th ed., vol. 6, page 576.
Justus Liebig's Annalen der Chemie, vol. 472 (1929), page 71.